3,299,007
INTERPOLYMER OF ACRYLONITRILE, A MASKED ISOCYANATE AND A HYDROXYL SUBSTITUTED MONOMER AND A PROCESS FOR MAKING SAME

Carlhans Süling and Egon Kuntz, Leverkusen, Germany, assignors to Farbenfabriken Bayer Aktiengesellschaft, Leverkusen, Germany, a German corporation
No Drawing. Filed Aug. 6, 1964, Ser. No. 387,997
Claims priority, application Germany, Aug. 31, 1963, F 40,649
12 Claims. (Cl. 260—77.5)

This invention relates to acrylonitrile polymers containing at least 80% acrylonitrile and which are capable of being cross-linked and a process for producing these acrylonitrile polymers.

It is known to copolymerize acrylonitriles with masked polymerizable isocyanates and it has been proposed to build up ternary copolymers from acrylonitrile, an unsaturated polymerizable masked isocyanate and another monomer containing active hydrogen atoms. Acrylamide, methacrylamide, acrylic acid, methacrylic acid and acid esters of maleic or fumaric acid are mentioned as suitable monomers containing active hydrogen atoms for these ternary copolymers. However, a disadvantage when using polymers containing carboxyl groups as fibre raw material is that carbon dioxide is split off during the cross-linking reaction. In dry spinning for example the cross-linking reaction occurs during the spinning process and hence gas bubbles in the spinnerette cause tearing of the filaments. Cross-linking after the spinning process causes gas bubbles in the filaments or films produced and the resulting fibres or films have a very irregular structure.

The use of acrylamide or methacrylamide as component having active hydrogen atoms is not useful because these carbonamides only react with masked isocyanate groups at relatively high temperatures, and acrylonitrile polymers undergo yellow discoloration if they are kept for some time at temperatures above $+160$ to $+170°$ C. Yellowed fibres or filaments are useless for the production of textiles.

It is an object of this invention to provide fiber forming acrylonitrile polymers which are capable of being cross-linked and which show no discoloration.

A further object is to provide a process for preparing fiber-forming acrylonitrile copolymers which can be cross-linked.

Further objects will appear hereinafter.

In accordance with the invention, the above objects are obtained by copolymerizing acrylonitrile with a masked polymerizable isocyanate and another monomer which contains at least one primary and/or secondary hydroxyl group and possibly another monomer of the acrylate, methacrylate, methacrylamide and vinyl ester group.

More particularly in accordance with the invention, fiber-forming acrylonitrile polymers capable of being cross-linked are obtained by heating at least 80% acrylonitrile, a polymerizable ethylenically unsaturated masked isocyanate and a polymerizable ethylenically unsaturated monomer containing at least one hydroxyl group which may be a primary or a secondary hydroxyl group. The masked isocyanate and the hydroxyl group-containing monomer are present in the resulting acrylonitrile polymer in a copolymerized form. The amount of the hydroxyl group-containing monomer used lies in the range of 0.1% to about 15% by weight of said acrylonitrile polymer and the amount of the masked isocyanate in the range of 0.1% to 15% by weight.

The copolymerization reaction in accordance with the invention is effected in an aqueous acidic medium at a temperature of from 30–80° C. in the presence of a redox catalyst as, for instance, a persulfate/bisulfite or chlorate/bisulfite system. The acrylonitrile copolymers obtained consist of at least 80% acrylonitrile, a masked isocyanate containing a vinyl group, an acryloyl or methacryloyl group and a hydroxyl group containing vinyl, aryloyl or methacryloyl compound in copolymerized form. The copolymer thus produced is spinnable to fibers from a solution in dimethylformamide. The fibers have a light color and can be made insoluble by cross-linking without the addition of a cross-linking agent and catalyst.

Fibre-forming acrylonitrile copolymers are acrylonitrile copolymers having at least 80% bound acrylonitrile. Suitable for use as masked, unsaturated polymerizable isocyanates are, for example, addition compounds of unsaturated polymerizable isocyanates such as isocyanates of acrylic acid esters, allyl ether isocyanates, styrylisocyanate or vinylisocyanate with phenols, tertiary alcohols, hydrocyanic acid or alkali bisulphite, or with compounds having activated methylene groups, such as malonic ester or ethyl acetoacetate. Comonomers having at least one primary or secondary hydroxyl group are, for example, allyl alcohol and its derivatives. Compounds which are especially suitable as comonomers having at least one primary and/or secondary hydroxyl group are acrylic acid esters which contain at least one primary or secondary hydroxyl group in the alcohol component, e.g. glycol acrylate, acrylic acid oxypropyl ester and glycerol monoacrylate; also very suitable are methacrylic acid esters which contain one hydroxyl group in the alcohol component, such as glycol methacrylate and glycerol mono methacrylate. Further very suitable compounds include α-hydroxymethyl acrylic acid esters, such as α-hydroxymethyl acrylic acid methyl ester and α-hydroxymethylacrylic acid ethyl ester, and acrylic acid- and methacrylic acid amides which have one hydroxyl group in the amine component, e.g. methacrylic acid dihydroxyethylamide, acrylic acid hydroxyethylamide, methacrylic acid glucosamide and acrylic acid glucosamide.

Reaction products of β-isocyanato-ethyl esters of acrylic acid or methacrylic acid with primary or secondary hydroxyamines as well as hydroxyacetic acid vinyl esters are also very suitable as components containing hydroxyl groups.

For the successful use of the acrylonitrile copolymers according to the invention as raw materials for fibres, further comonomers are necessary in many cases. For example, textile fibres are required to have a certain minimum affinity to basic or acid dyestuffs. To obtain this, additional comonomers such as vinyl pyridine or the β-dimethylaminoethyl ester of acrylic acid are used. The salts of unsaturated polymerizable sulphonic acids, such as styrene sulphonic acid alkali metal salts or the alkali metal salts of unsaturated polymerizable disulphonimides, may also be used as components with an affinity for dyestuffs. Contrary to most of the polyacrylnitrile-fibres the fibres and films prepared from the copolymers according to this invention are dyeable in deep color tones with acid and basic dyestuffs without addition of co-compounds having an affinity to colors. Further, it may be of advantage to use, as additional comonomers, monomers which have an improving effect on the spinning behaviour of the copolymers. Examples of such comonomers include acrylic acid alkyl esters, such as methyl acrylate and butyl acrylate, or methacrylic acid alkyl esters such as methyl methacrylate and ethyl methacrylate, or styrene, vinyl acetate and vinyl propionate. However, the copolymer should consist mainly of bound acrylonitrile. Only then are such copolymers suitable as raw materials for high quality acrylic fibres.

Polymerization may be carried out by means of the solution, precipitation, suspension or emulsion polymerization processes. The usual peroxidic catalysts or aliphatic azo compounds are suitable as polymerization initiators.

A preferred method of carrying out the polymerization is precipitation polymerization in an aqueous medium at pH values below 6, using redox systems as polymerization initiators and temperatures between 30 and 80° C. (preferably 35 and 70° C.), if desired in the presence of small quantities of heavy metal ions. Special advantages are obtained using redox systems based on persulphates or chlorates and water soluble lower valency sulphur compounds. It is advantageous to choose the redox system such that a considerable molar excess of reducing components is present in the polymerization medium. Suitable water-soluble sulphur compounds of lower valency are, for example, $SO_2$, alkali metal salts of sulphinic acids, alkali metal bisulphites, ammonium bisulphite, alkali metal bisulphites and alkali metal thiosulphates. Reducing agents from the class of reducing nitrogen compounds such as hydrazine and derivatives of hydrazine and hydroxylamine may, of course, also be used, either alone or as additional reducing components of the redox system. Rongalite is also an excellent reducing component of the redox system.

Using redox activation is a simple way of achieving rapid polymerization and preventing marked decomposition of the masked unsaturated isocyanates even in the acid pH region. The polymerization medium is adjusted to the desired pH region by the addition of inorganic or organic acids such as sulphuric acid, hydrochloric acid, nitric acid, orthophosphoric acid, pyrophosphoric acid, and metaphosphoric acid or acetic acid, chloroacetic acid, oxalic acid and benzoic acid. If the quantities of initiator are suitably dosed and suitable temperature regions are chosen, the molecular weights of the copolymers will lie in a region such that the copolymers can easily be worked up into fibres, filaments, foils and films from solutions. Solvents for the polymers are the usual polar organic solvents for polyacrylonitrile, e.g. dimethylsulphoxide, dimethylformamide, dimethylacetamide and ethylene glycol carbonate or concentrated aqueous solutions of inorganic salts such as concentrated zinc chloride solutions or concentrated aqueous solutions of ammonium thiocyanate.

The copolymers according to the invention can be converted into highly concentrated viscous, gel-free solutions. Swelling particles do not appear even if the quantity of components containing hydroxyl groups and of polymerizable isocyanate is greater than 10% calculated on the total monomers.

The copolymers according to the invention and fibres or filaments thereof are cross-linked simply by heating them to temperatures of 100 to 160° C. After cross-linking, the polymers are insoluble in all the well-known solvents.

In the following examples, the parts by volume are related to the parts by weight as cc. to g.

EXAMPLE 1

A polymerization vessel is charged with 100 parts by volume of water and 0.2 part by volume of N-sulphuric acid, heated to 55° C. and washed with nitrogen. Solutions I, II and III given below are then added dropwise simultaneously in the course of 3 hours and the reaction mixture is maintained at 55° C. during polymerization.

Solution I 300 parts by volume of water, 7 parts by volume of N-sulphuric acid and 0.6 part by weight of potassium persulphate.

Solution II 300 parts by volume of water and 0.9 part by weight of sodium pyrosulphite.

Solution III 106 parts by weight of acrylonitrile, 0.75 part by weight of methacrylic acid dihydroxyethylamide and 0.25 part by weight of the reaction product of methacrylic acid $\beta$-isocyanatoethyl ester and tertiary butanol.

After a few minutes, the polymer formed is precipitated as a white, fine-grained precipitate. After drying, a copolymer having a K-value of 92.8 is obtained in a yield of 94.5%. When films are produced from the copolymer, cross-linking occurs at 130° C. After cross-linking, the films are isoluble in dimethylformamide.

EXAMPLE 2

A polymerization vessel is charged with 100 parts by volume of water, heated to 55° C., and the atmospheric oxygen is displaced by washing with nitrogen. Solutions I, II and III below are then simultaneously added dropwise at 55° C. within 4 hours and the reaction mixture maintained at 55° C. during the time of polymerization.

Solution I 300 parts by volume of water, 7 parts by volume of N-sulphuric acid and 0.6 part by weight of potassium persulphate.

Solution II 300 parts by volume of water, 0.9 part by weight of sodium pyrosulphite and 5 parts by weight of 2-methacryloylamino-2-hydroxymethyl-propane-1:3-diol.

Solution III 106 parts by weight of acrylonitrile and 5 parts by weight of the addition product of methacrylic acid-$\beta$-isocyanato ethyl ester and phenol.

The 2 - methacryloylamino-2-hydroxymethyl-propane-1:3-diol is obtained as a white powder (M.P. 91–93° C.) by reacting 2-amino-2-hydroxymethyl-propane-1:3-diol with methacrylic acid chloride in acetone.

After a short time, the copolymer formed separates. The white granular precipitate is filtered off and dried at 50° C. The yield of copolymer is 70% of the theory; the K-value is 84 to 85. The copolymer forms a clear solution in dimethylformamide. Films of the copolymer are insoluble in boiling dimethylformamide after heating to 130° C.

Fibres and films prepared from this copolymer are dyeable—as well before cross-linking as after cross-linking—in deep color tones with acid and basic dyestuffs.

EXAMPLE 3

A polymerization vessel is charged with 100 parts by volume of water and 0.2 part by volume of N-sulphuric acid, the air is displaced by nitrogen and the temperature is adjusted to 55° C. Solutions I, II and III below are then run in simultaneously in the course of three hours.

Solution I 300 parts by volume of water, 0.9 part by weight of sodium pyrosulphite and 0.5 part by weight of the sodium salt of N - benzenesulphonyl-3-methacryloylamine-benzene-sulphonic acid amide.

Solution II 300 parts by volume of water, 7 parts by volume of n-sulphuric acid and 0.6 part by weight of potassium persulphate.

Solution III 106 parts by weight of acrylonitrile, 2 parts by weight of methacrylic acid hydroxypropyl ester, 4 parts by weight of the addition compound of phenol and methacrylic acid $\beta$-isocyanatoethyl ester.

After filtration and drying, a white powder with a K-value 79.8 is obtained which is soluble in dimethylformamide without the formation of swelling particles. After tempering, the copolymer only swells slightly and solutions which can be rendered clear by filtration can no longer be obtained.

What we claim is:

1. A fiber-forming cross-linkable acrylonitrile copolymer comprising at least 80% of acrylonitrile, a masked isocyanate and an ethylenically unsaturated monomer containing at least one hydroxyl group selected from the group consisting of primary and secondary hydroxyl groups, said hydroxyl group containing monomer being present in said copolymer in an amount of from 0.1% to about 15%.

2. A fiber-forming cross-linkable copolymer comprising at least 80% of acrylonitrile, a masked methacrylic acid isocyanato ester and a methacryloyl compound containing at least one hydroxyl group.

3. A fiber-forming cross-linkable copolymer comprising at least 80% of acrylonitrile, a masked isocyanate containing a vinyl group, an acryloyl or methacryloyl group and a hydroxyl group containing vinyl, aryloyl or methacryloyl compound in copolymerized form.

4. The copolymer of claim 1 wherein said hydroxyl group-containing monomer is methacrylic acid dihydroxy ethylamide.

5. The copolymer of claim 1 wherein said hydroxyl group-containing monomer is 2-methacryloyl-amino-2-hydroxymethyl-propane-1,3-diol.

6. The copolymer of claim 1 wherein said hydroxyl group-containing monomer is methacrylic acid hydroxypropylester.

7. The copolymer of claim 1 wherein said polymerizable ethylenically unsaturated masked isocyanate is the reaction product of methacrylic acid β-isocyanato ethylester and tertiary butanol.

8. The copolymer of claim 1 wherein said polymerizable ethylenically unsaturated masked isocyanate is the addition product of methacrylic acid β-isocyanato ethylester and phenol.

9. The fibre-forming acrylonitrile copolymer of claim 1 wherein from about 1 to 15% of a copolymerizable monomer selected from the group consisting of an acrylate, a methacrylate, a methacrylamide and a vinyl ester, a polymerizable ethylenically unsaturated masked isocyanate and from about 0.1 to about 15% of said hydroxyl group-containing monomer are present in copolymerized form in said polymer.

10. The acrylonitrile copolymer of claim 1 in the form of filament, the copolymer of said filament having been cross-linked by heating at a temperature of +100 to about +160° C.

11. A process for preparing fiber-forming cross-linkable acrylonitrile copolymers which comprises copolymerizing a mixture of at least 80% acrylonitrile, a polymerizable ethylenically unsaturated masked isocyanate and a polymerizable ethylenically unsaturated monomer containing at least one hydroxyl group selected from the group consisting of primary and secondary hydroxyl groups in an aqueous medium, at a pH-value of below 7, at a temperature of between 30 and 80° C. in the presence of a redox system as polymerization initiator.

12. The process of claim 11, wherein the redox system consists of potassium persulfate and sodium pyrosulfite.

References Cited by the Examiner

UNITED STATES PATENTS

| | | | |
|---|---|---|---|
| 2,718,516 | 9/1955 | Bortnick | 260—86.1 |
| 2,882,260 | 4/1959 | Bartl et al. | 260—77.5 |
| 3,080,368 | 3/1963 | Wegler et al. | 260—77.5 |

JOSEPH L. SCHOFER, *Primary Examiner.*

JAMES A. SEIDLECK, *Examiner.*

W. HOOVER, *Assistant Examiner.*